(12) United States Patent
Gao et al.

(10) Patent No.: US 9,032,175 B2
(45) Date of Patent: May 12, 2015

(54) DATA MIGRATION BETWEEN STORAGE DEVICES

(71) Applicant: International Business Machines Corporation, Armonk, NY (US)

(72) Inventors: Xue Dong Gao, Shanghai (CN); Hai Bo Qian, Shanghai (CN); Jun Wei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 13/663,818

(22) Filed: Oct. 30, 2012

(65) Prior Publication Data

US 2013/0111172 A1 May 2, 2013

(30) Foreign Application Priority Data

Oct. 31, 2011 (CN) .......................... 2011 1 0335849

(51) Int. Cl.
*G06F 12/02* (2006.01)
*G06F 3/06* (2006.01)

(52) U.S. Cl.
CPC .............. *G06F 12/02* (2013.01); *G06F 3/0647* (2013.01); *G06F 3/0613* (2013.01); *G06F 3/0685* (2013.01)

(58) Field of Classification Search
None
See application file for complete search history.

(56) References Cited

U.S. PATENT DOCUMENTS

| 6,912,635 | B2 | 6/2005 | Patterson et al. |
| 8,005,809 | B2 * | 8/2011 | Buckler ........................ 707/705 |
| 2007/0061515 | A1 | 3/2007 | Kano |
| 2009/0300283 | A1 | 12/2009 | Kudo |
| 2010/0082765 | A1 | 4/2010 | Murase |
| 2010/0174677 | A1 | 7/2010 | Zahavi et al. |
| 2010/0199036 | A1 | 8/2010 | Siewert et al. |
| 2010/0211737 | A1 | 8/2010 | Flynn et al. |
| 2011/0197046 | A1 * | 8/2011 | Chiu et al. ..................... 711/171 |

FOREIGN PATENT DOCUMENTS

EP           0 725 324 B1       3/2005

OTHER PUBLICATIONS

Zhang, G. Chiu, L. and Liu, L. (2010) Adaptive Data Migration in Multi-tiered Storage Based Cloud Environment:, 2010 IEEE 3$^{rd}$ International Conference on Cloud Computing.*
"Just in Time Storage Tiering", EMC Whitepaper, Transaction Performance Management, Precise Software Solutions, 2010, pp. 1-4.

(Continued)

*Primary Examiner* — Christian P Chace
*Assistant Examiner* — Tracy A Warren
(74) *Attorney, Agent, or Firm* — Stephen R. Tkacs; Stephen J. Walder, Jr.; Randall J. Bluestone

(57) ABSTRACT

A method for data migration between storage devices according to an embodiment of the invention comprises: collecting an original time domain sequence of workload parameters of a data volume in a low speed storage device; evaluating a workload period of the data volume based on the collected original time domain sequence of the workload parameters; and migrating the data in the data volume according to the evaluated workload period so that the data is located in a high speed storage device during a workload peak of the data volume. The embodiments of the invention can improve a data access speed in the storage devices.

24 Claims, 4 Drawing Sheets

(56) References Cited

OTHER PUBLICATIONS

Anderson, Eric et al., "Hippodrome: running circles around storage administration", Proceedings of the FAST 2002 Conference on File and Storage Technologies, Jan. 28-30, 2002, pp. 175-188.

Eads, Damian et al., "Viewing Adaptive Migration Policies for Tiered Storage Systems as a Supervised Learning Problem", CiteSeerX, 2006, pp. 1-12.

Lim, Harold C. et al., "Automated Control for Elastic Storage", ICAC'10, Jun. 7-11, 2010, pp. 1-10.

Zhang, Gong et at, "Automated Lookahead Data Migration in SSD-enabled Multi-tiered Storage Systems", 2010 IEEE 26th Symposium on Mass Storage Systems and Technologies (MSST), May 3-7, 2010, 6 pages.

* cited by examiner

DATA MIGRATION BETWEEN STORAGE DEVICES

BACKGROUND

The invention relates to a storage technique, and more specifically to a method and apparatus for data migration between storage devices.

A mass storage system often consists of various types of storage devices, and these storage devices range widely in price and performance. For example, reading a copy of data from a hard disk driver (HDD) with 15000 revolutions per minute (RPM) needs an average response time of 10 ms, whereas reading the data directly from a solid state disk (SSD) needs an average response time of less than 1 ms. However, the cost of a high speed storage device is higher than that of a low speed storage device, and a data capacity of the high speed storage device in the system is less than that of the low speed storage device. Therefore, only a part of data will be stored in the high speed storage device.

It is provided that: in the storage system, the smallest unit of data is a data block; a plurality of data blocks form a data volume; and an application requests one or more data volumes. It can be determined, from a frequency of data access, which data need to be stored in the high speed storage device, thereby migrating the data from the low speed storage device to the high speed storage device. Those skilled in the art would understand that, the data block and the data volume here both are logical concepts rather than physical concepts.

In other words, data of a data volume or a data block may be stored on a plurality of physical storage devices. Thus, such a migration is transparent to applications using the data. It can be determined whether or not a data block is a hotspot data block according to a frequency of access to the data block and a response time of access to the data block. If it is a hotspot data block, it is migrated from the low speed storage device to the high speed storage device. However, being frequently accessed in a past period does not mean that the data block will be frequently accessed in a future period.

Therefore, there is a need for a new solution for data migration between storage devices.

SUMMARY

The illustrative embodiments of the invention provide a method and apparatus for data migration between storage devices.

A method for data migration between storage devices according to an embodiment of the invention comprises: collecting an original time domain sequence of workload parameters of a data volume in a low speed storage device; evaluating a workload period of the data volume based on the collected original time domain sequence of the workload parameters; and migrating the data in the data volume according to the evaluated workload period so that the data is located in a high speed storage device during a workload peak of the data volume.

An apparatus for data migration between storage devices according to an embodiment of the invention comprises: a collecting module configured to collect an original time domain sequence of workload parameters of a data volume in a low speed storage device; an evaluating module configured to evaluate a workload period of the data volume based on the collected original time domain sequence of the workload parameters; and a migrating module configured to migrate the data in the data volume according to the evaluated workload period so that the data is located in a high speed storage device during a workload peak of the data volume.

The illustrative embodiments of the invention can improve a data access speed in the storage devices.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
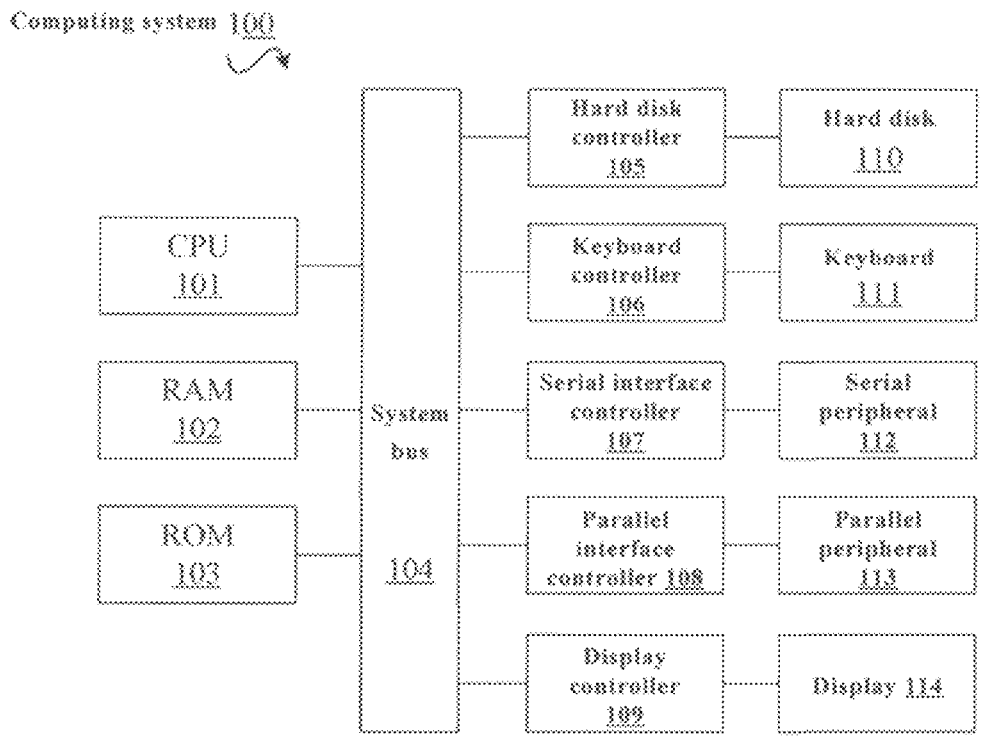
FIG. 1 is a block diagram showing an exemplary computing system 100 which is applicable to implement the embodiments of the invention.

As will be understood by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, so that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, so that the instructions stored in the computer readable medium produce an article of manufacture of instruction means including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process so that the instructions which execute on the computer or other programmable apparatus provide processes for implementing the functions/acts specified in the flowchart and/or block diagram block or blocks.

The invention will be described below in combination with specific illustrative embodiments with reference to the accompanying drawings. Such a description is made for the purpose of illustration only and should not be construed as limiting the scope of the invention.

FIG. 1 shows an exemplary computer system 100 which is applicable to implement the illustrative embodiments of the present invention. As shown in FIG. 1, the computing system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

Figure 2:
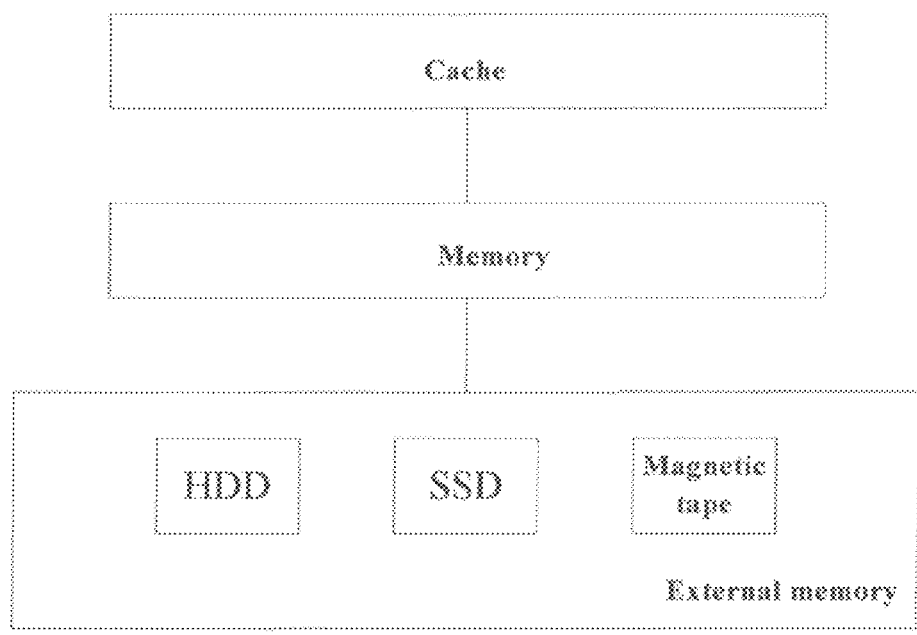
FIG. 2 is a schematic diagram showing tiers of the storage devices according to an embodiment of the invention.

FIG. 2 shows a storage system tier structure according to an embodiment of the invention. In general, when a CPU wants to process data on an external memory, the data is firstly read from the external memory into an internal memory, and then from the internal memory into a cache. In the following description, the external memory comprises various types of storage devices that are categorized into high speed storage devices and low speed storage devices. However, those skilled in the art would understand that, memories in other tiers may also comprise various types of storage devices, such that the mechanisms according to the illustrative embodiments of the invention apply to these alternative structures.

Figure 3:
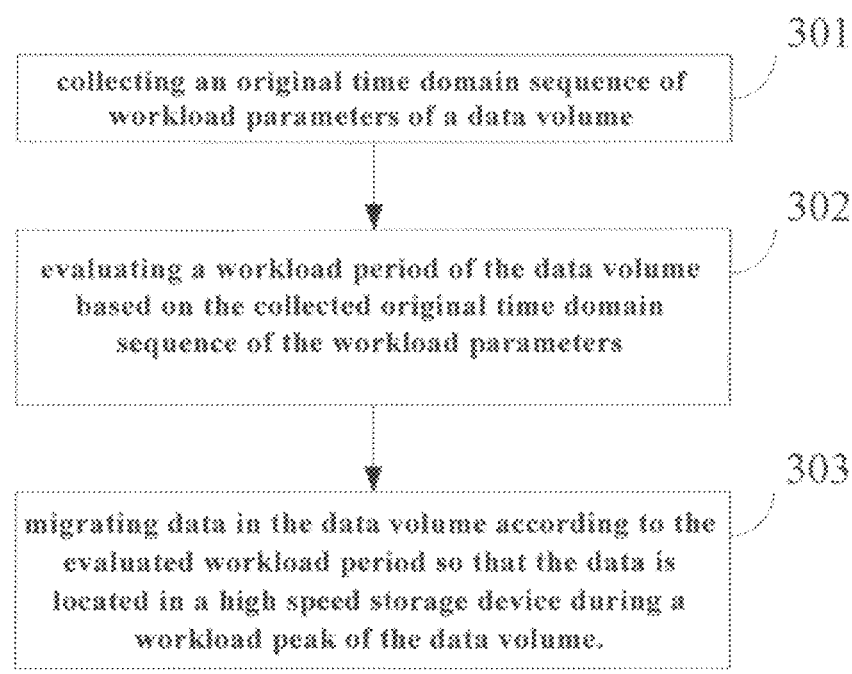
FIG. 3 is a flow chart showing a method for data migration between storage devices according to an embodiment of the invention.

FIG. 3 is a flow chart showing a method for data migration between storage devices according to an embodiment of the invention.

At step 301, an original time domain sequence of workload parameters of a data volume is collected.

As described above, an application uses a storage capacity in the storage system with data volumes as the elementary units. Different applications access the storage system in different modes. Therefore, workload parameters collected for the data volume can reflect different access modes. The workload parameter may be a response time, e.g., a response time of access to the data volume at various sampling time points. The load parameter may also be an access speed, e.g., TOPS of access to the data volume. Those skilled in the art could also adopt other types of workload parameters.

For a particular data volume, what is collected at step 301 is workload parameters of the particular data volume at various sampling time points, i.e., an original time domain sequence of the workload parameters.

According to an embodiment of the invention, after collecting the original time domain sequences of the workload parameters of the data volumes, a clustering operation is performed on the original time domain sequences of the workload parameters of the data volumes. After the clustering operation, similar original time domain sequences are classified into the same cluster. In this way, a subsequent operation can be performed on each of the categories, and the result obtained can be applied to the data volumes corresponding to a plurality of original time domain sequences in the cluster.

How to perform the clustering operation is customary technical means in the art and thus is omitted here.

At step 302, a workload period of the data volume is evaluated based on the collected original time domain sequence of the workload parameters.

According to an embodiment of the invention, a time-frequency transform analysis method can be adopted to obtain a frequency domain characteristic of the workload parameters from the original time domain sequence of the workload parameters, e.g., Fourier transformation, Z transformation, Laplace transformation and etc.

In the following description, Fourier transformation is taken as an example. Those skilled in the art would understand that, since it is discrete data that is collected at step 301, a discrete Fourier transformation can be adopted, and preferably Fast Fourier Transformation can be adopted for obtaining the frequency domain characteristic of the workload parameters.

In the following description, a more detailed description is given on how to evaluate the workload periods of the data volumes from results of the time-frequency transform.

According to an embodiment of the invention, linear components are removed from the original time domain sequence of the workload parameters prior to the time-frequency transform. It is possible that an application temporarily increases or decreases an amount of the used data volumes upon receipt of an instruction. Such a change is not a part of an access mode of the application to the storage device, but will cause a change in the workload parameters of the corresponding data volume, thereby applying noise to the frequency domain characteristic.

Methods such as linear fitting analysis or linear regression analysis can be used for obtaining the linear components from the original time domain sequence of the workload parameters. Linear fitting analysis and linear regression analysis are customary technical means in the art and thus, a detailed description of these techniques is omitted here.

At step 303, data in the data volume is migrated according to the evaluated workload period so that the data is located in the high speed storage device during a workload peak of the data volume.

Since the workload periods of the data volumes have been obtained at the step 302, it can be predicted that in a period in the future, a great deal of accesses to the data volumes will occur, that is, a workload peak occurs. According to the prediction result, the data in the data volumes can be migrated from the low speed storage device into the high speed storage device in advance. As described above, migration of the data in the data volumes between the storage devices is transparent to the application using the data volumes.

Those skilled in the art would understand that, the so-called workload peak period here does not necessarily refer to the time moment when the maximum workload occurs. It may also refer to a period of time during which the workload is greater than a workload threshold. The workload threshold can be an absolute value or a relative value. By taking the relative value as an example, the workload threshold can be a ratio of an actual workload to a rated workload of the data volume. In addition, "the data is located in the high speed storage device during the workload peak of the data volume" here shall not be understood as requiring that the data is located in the high speed storage device in the whole workload peak period and thereafter. According to an embodiment of the invention, the data can be migrated back into the low speed storage device at the end of the workload peak period of the data volume. According to another embodiment of the invention, a timer is set to start when the data is migrated into the high speed storage device, and the data is migrated back into the low speed storage device when the timing is finished. In the embodiment, it is possible that the data is migrated back into the low speed storage device before the end of the workload peak period of the data volume.

Since there are a great number of volumes in the storage system, it is possible that workload peaks for a plurality of data volumes occur in the same period. On the other hand, the storage capacity of the high speed storage device is limited, and a total data quantity of the plurality of data volumes for which workload peaks occur may exceed the storage capacity of the high speed storage device.

In order to solve this problem, according to an embodiment of the invention, only some data blocks in the data volume are moved. As described before, it can be determined whether or not a data block is a hotspot data block according to a frequency of access to the data block and a response time of access to the data block. For those data volumes for which workload peaks are about to occur, hotspot data blocks contained therein can be determined, and the hotspot data blocks are migrated into the high speed storage device. By setting a criterion of hotspot data blocks, the number of the hotspot data blocks can be controlled to be adapted to the storage capacity of the high speed storage device.

According to another embodiment of the invention, a priority-based migration policy is adopted. In a period of time, the migration operation is performed preferentially on a data volume with a higher priority. Different applications corresponding to the data volumes may be set with different priorities. Therefore, priorities of the corresponding applications can be used for setting priorities of the data volumes. Priorities of the data volumes can also be set according to an amount of data in the hotspot. For example, if a hotspot data block contained in a data volume has a larger data amount than another data volume, the priority of the data volume is higher than the other data volume. Those skilled in the art could set the priorities by other ways without departing from the spirit and scope of the present invention.

The above methods of controlling the migrated data quantity can be used separately or in combination with each other. For example, the migration operation on a data volume with a higher priority can be a migration operation on the whole data volume or a migration operation on the hotspot data blocks in the data volume.

How the workload periods of the data volumes are evaluated according to results of the time-frequency transform is described below in combination with FIG. 4 and FIG. 5.

Figure 4:
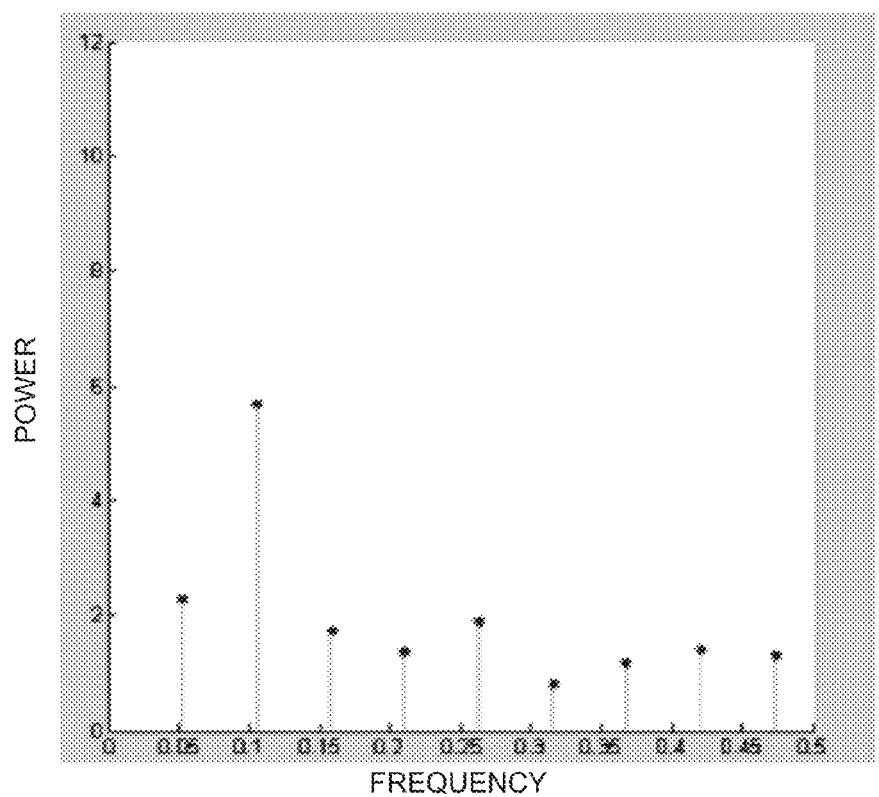
FIG. 4 is a frequency domain characteristic obtained by performing fast Fourier transformation on an original time domain sequence of the workload parameters.

FIG. 4 is a frequency domain characteristic obtained by performing Fast Fourier Transformation on the original time domain sequence of the workload parameters, wherein the lateral axis represents the frequency components after the Fast Fourier Transformation, and the vertical axis represents power of the frequency components.

Figure 5:
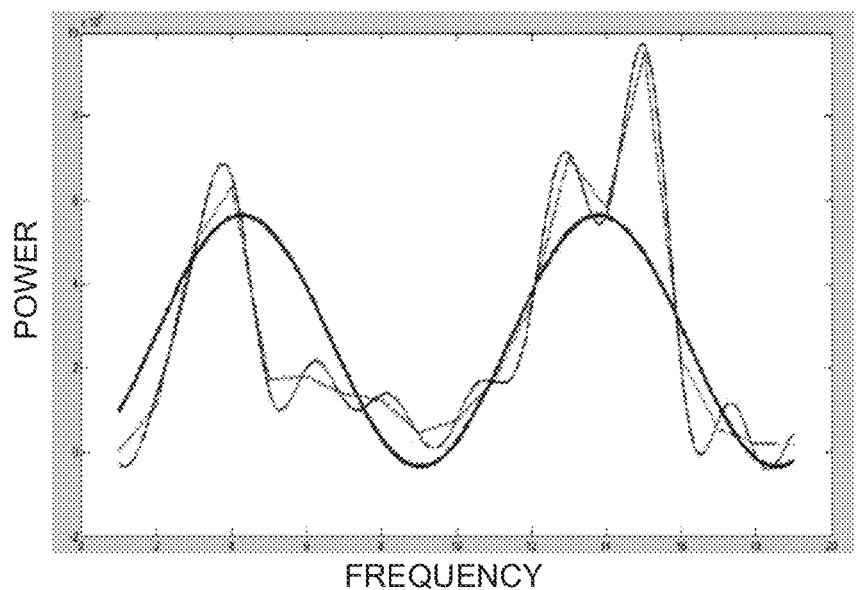
FIG. 5 is a comparison made between a recovery time domain sequence obtained by performing Fourier inverse transformation on partial frequency components selected in FIG. 4, and the original time domain sequence.

FIG. 5 is a comparison made between a recovery time domain sequence, which is obtained by performing frequency-time transform through Fourier inverse transformation on partial frequency components selected in FIG. 4, and the original time domain sequence, wherein a dotted line represents the original time domain sequence, a bold solid line represents a recovery time domain sequence obtained by performing Fourier inverse transformation on only a frequency component with a highest power, and a light solid line represents a recovery time domain sequence obtained by performing fast Fourier inverse transformation on nine frequency components with highest power. It can be seen that, as more frequency components are considered, the recovery time domain sequence approaches the original time domain sequence more sufficiently. The light solid line in FIG. 5 relatively accurately reflects a change in the dotted line. However, the bold solid line in FIG. 5 also reflects a general changing trend of the dotted line. In particular, the workload peak of the bold solid line almost coincides with the workload peak of the dotted line in the time axis.

Those skilled in the art would further understand that, the frequency components obtained after fast Fourier transformation do not have a multiple relation between them; theoretically, a period of a signal is a least common multiple of the periods corresponding to the frequency components. In practice, for such a signal as the original time domain sequence of the workload parameters, if all the frequency components are considered, the evaluated period will become very large, thus the workload peak cannot be predicted from the period.

Therefore, on the one hand, it is needed to select frequency components as much as possible to better approach the original time domain sequence and improve correctness of the evaluation of the period; on the other hand, it is needed to select frequency components as few as possible to make the evaluated period as small as possible to thereby effectively predict the workload peak.

Since a frequency component with a higher power occupies more share in the signal, according to an embodiment of the invention, a power threshold can be set. Only those frequency components whose power is higher than the power threshold are selected for evaluating the workload period of the data volume. For those frequency components whose power is less than the power threshold, since they have less impact on the prediction of the workload peak, they are not considered any more. The power threshold may be directed to power of an individual frequency component, or an order of the frequency component in the power ranking.

According to another embodiment of the invention, an error threshold is set. The error represents how close the recovery time domain sequence obtained by fast Fourier inverse transformation approaches the original time domain sequence when only some frequency components are considered. For example, the recovery time domain sequence and the original time domain sequence may be represented as two vectors and a distance between the two vectors serves as the error. Also for example, a difference between a power sum of the selected frequency components and a power sum of all the frequency components serves as the error. As few frequency components as possible are selected so long as the error between the recovery time domain sequence and the original time domain sequence is less than the error threshold.

According to a further embodiment of the invention, a period threshold is set. As much frequency components as possible are selected so long as the period evaluated according to the selected frequency components is less than the period threshold.

The following situation may take place in practice: on the one hand, selecting fewer frequency components cannot satisfy the error threshold; on the other hand, selecting more frequency components cannot satisfy the period threshold. This shows that, access to the data volume by the application has poor periodicity. In this case, the traditional hotspot data block-based migration solution still can be adopted.

Figure 6:
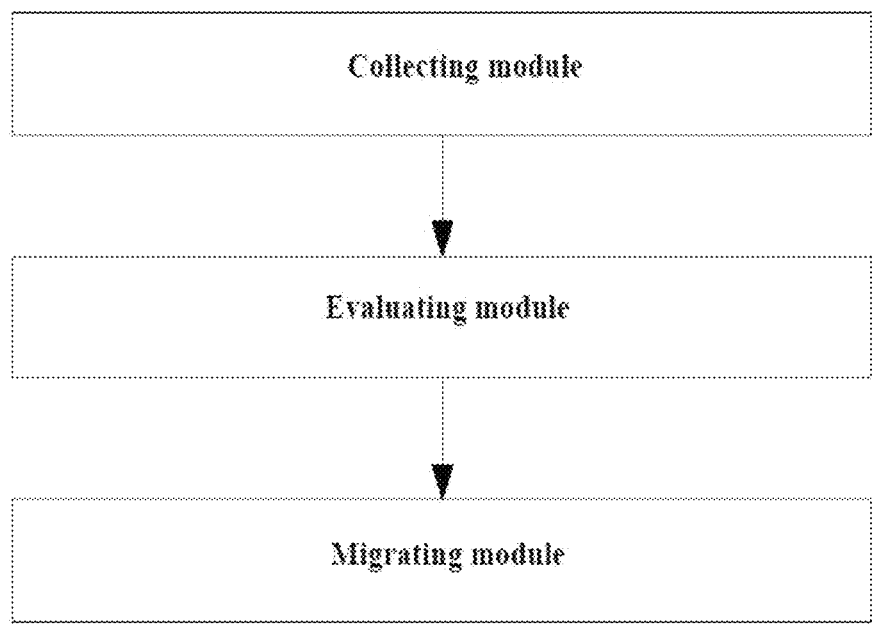
FIG. 6 is a block diagram showing an apparatus for data migration between storage devices according to an embodiment of the invention.

FIG. 6 is a block diagram showing an apparatus for data migration between storage devices according to an embodiment of the invention.

An apparatus for data migration between storage devices according to an embodiment of the invention comprises:

a collecting module configured to collect an original time domain sequence of workload parameters of a data volume in a low speed storage device;

an evaluating module configured to evaluate a workload period of the data volume based on the collected original time domain sequence of the workload parameters; and a migrating module configured to migrate the data in the data volume according to the evaluated workload period so that the data is located in a high speed storage device during a workload peak of the data volume.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical volume function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the method and apparatus according to the invention have been described in detail above in combination with the specific embodiments, the invention is not limited thereto. Those skilled in the art could make various variations, substitutions and modifications to the invention according to the teaching of the specification, without departing from the spirit and scope of invention. It should be understood that, all these variations, substitutions and modifications still fall into the scope of protection of the invention. The scope of protection of the invention is defined only by the accompanying claims.

What is claimed is:

1. A method for data migration between storage devices, comprising:
    collecting an original time domain sequence of workload parameters for a data volume in a low speed storage device;
    performing a time-frequency transform on the original time domain sequence of the workload parameters to obtain frequency domain characteristics of the workload parameters;
    selecting frequency components of the frequency domain characteristics such that a period evaluated according to the selected frequency components is less than a period threshold;
    determining a predicted workload peak period of the data volume based on the selected frequency components of the workload parameters; and
    migrating data in the data volume to a high speed storage device during the predicted workload peak period of the data volume.

2. The method according to claim 1, further comprising:
    removing linear components from the original time domain sequence of the workload parameters before performing the time-frequency transform on the original time domain sequence of the workload parameters.

3. The method according to claim 1, wherein migrating data in the data volume according to the evaluated workload period comprises:
    migrating data in hotspot data blocks of the data volume.

4. The method according to claim 1, wherein migrating data in the data volume according to the evaluated workload period comprises:
when data in a plurality of data volumes is to be migrated, preferentially migrating a data volume with a higher priority.

5. The method according to claim 1, wherein collecting an original time domain sequence of workload parameters of a data volume in a low speed storage device comprises collecting original time domain sequences of workload parameters of a plurality of data volumes, the method further comprising:
performing a clustering operation on the original time domain sequences of workload parameters of the plurality of data volumes so that similar original time domain sequences are classified into a same cluster, and
determining the predicted workload peak period of a respective cluster and applying the evaluated predicted workload peak period to the data volumes corresponding to the original time domain sequences in the respective cluster.

6. The method according to claim 1, wherein selecting frequency components of the frequency domain characteristics comprises:
selecting, according to the frequency domain characteristics frequency components having a power that is greater than a power threshold.

7. The method according to claim 1, wherein determining the predicted workload peak period of the data volume according to the frequency domain characteristic of the workload parameters comprises:
selecting the frequency components such that an error between a recovery time domain sequence and the original time domain sequence is less than an error threshold, wherein the recovery time domain sequence is a time domain sequence obtained by performing a frequency-time transform on the selected frequency components.

8. The method according to claim 1, further comprising:
migrating the data from the high speed storage device back into the low speed storage device.

9. An apparatus for data migration between storage devices, comprising:
a processor, and
a memory coupled to the processor, wherein the memory comprises instructions executed by the processor, the instructions comprising:
a collecting module configured to collect an original time domain sequence of workload parameters for a data volume in a low speed storage device;
a module configured to perform time-frequency transform on the original time domain sequence of the workload parameters to obtain frequency domain characteristics of the workload parameters;
a selecting module configured to select frequency components of the frequency domain characteristics such that the period evaluated according to the selected frequency components is less than a period threshold;
prediction module configured to determine a predicted workload peak period of the data volume based on the selected frequency components of the workload parameters; and
a migrating module configured to migrate data in the data volume to a high speed storage device during the predicted workload peak period of the data volume.

10. The apparatus according to claim 9, wherein the prediction module comprises:
a module configured to remove linear components from the original time domain sequence of the workload parameters before performing the time-frequency transform on the original time domain sequence of the workload parameters.

11. The apparatus according to claim 9, wherein the migrating module comprises:
a module configured to migrate data in hotspot data blocks of the data volume.

12. The apparatus according to claim 9, wherein the migrating module comprises:
a module configured to, when data in a plurality of data volumes is to be migrated, preferentially migrate a data volume with a higher priority.

13. The apparatus according to claim 9,
wherein the collecting module comprises a module configured to collect original time domain sequences of workload parameters of a plurality of data volumes;
wherein the instructions further comprise a module configured to perform a clustering operation on the original time domain sequences of workload parameters of the plurality of data volumes so that similar original time domain sequences are classified into a same cluster, and
wherein the prediction module is configured to determine the predicted workload peak period of a respective cluster and apply the predicted workload peak period to the data volumes corresponding to the original time domain sequences in the respective cluster.

14. The apparatus according to claim 9,
wherein the selecting module is configured to select, according to the frequency domain characteristics frequency components having a power that is greater than a frequency threshold.

15. The apparatus according to claim 9,
wherein the selecting module is configured to select the frequency components such that an error between a recovery time domain sequence and the original time domain sequence is less than an error threshold, wherein the recovery time domain sequence is a time domain sequence obtained by performing frequency-time transform on the selected frequency components.

16. The apparatus according to claim 9, wherein the instructions further comprise:
a module configured to migrate the data from the high speed storage device back into the low speed storage device.

17. A computer program product comprising a non-transitory computer readable storage medium having a computer readable program stored therein, wherein the computer readable program, when executed on a computing device, causes the computing device to:
collect an original time domain sequence of workload parameters for a data volume in a low speed storage device;
perform a time-frequency transform on the original time domain sequence of the workload parameters to obtain frequency domain characteristics of the workload parameters;
select frequency components of the frequency domain characteristics such that a period evaluated according to the selected frequency components is less than a period threshold;
determine a predicted workload peak period of the data volume based on the selected frequency components of the workload parameters; and
migrate data in the data volume to a high speed storage device during the predicted workload peak period of the data volume.

18. The computer program product according to claim 17, wherein the computer readable program further causes the computing device to:
   remove linear components from the original time domain sequence of the workload parameters before performing the time-frequency transform on the original time domain sequence of the workload parameters.

19. The computer program product according to claim 17, wherein collecting an original time domain sequence of workload parameters comprises collecting original time domain sequences of workload parameters of a plurality of data volumes, and wherein the computer readable program further causes the computing device to:
   perform a clustering operation on the original time domain sequences of workload parameters of the plurality of data volumes so that similar original time domain sequences are classified into a same cluster, and
   determine the predicted workload peak period of a respective cluster and apply the predicted workload peak period to the data volumes corresponding to the original time domain sequences in the respective cluster.

20. The computer program product according to claim 17, wherein selecting frequency components of the frequency domain characteristics comprises:
   selecting, according to the frequency domain characteristic, frequency components having a power that is greater than a frequency threshold.

21. The computer program product according to claim 17, wherein migrating data in the data volume according to the evaluated workload period comprises:
   migrating data in hotspot data blocks of the data volume.

22. The computer program product according to claim 17, wherein migrating data in the data volume according to the evaluated workload period comprises:
   when data in a plurality of data volumes is to be migrated, preferentially migrating a data volume with a higher priority.

23. The computer program product according to claim 17, wherein determining the predicted workload peak period of the data volume according to the frequency domain characteristic of the workload parameters comprises:
   selecting the frequency components such that an error between a recovery time domain sequence and the original time domain sequence is less than an error threshold, wherein the recovery time domain sequence is a time domain sequence obtained by performing frequency-time transform according to the selected frequency components.

24. The computer program product according to claim 17, wherein the computer readable program further causes the computing device to:
   migrate the data from the high speed storage device back into the low speed storage device.

* * * * *